and the motors for driving the same may be adjusted in a body without affecting any of the parts thereof.

The invention claimed is—

1. In a molding machine, a motor, a hollow sleeve in said motor, a rotor carried by said sleeve, a shaft entering said sleeve, means for causing said shaft to rotate with said rotor and have independent longitudinal movement thereof, a cutter head carried by said shaft, a slidably mounted ball bearing housing connected to one end of said shaft, an adjusting screw adapted to move said housing for adjusting the same, a cap on said housing into which the screw threads, and a stationary frame through which the screw extends.

2. In a molding machine, a motor including a rotor, said rotor being non-longitudinally movable in the motor, a longitudinally movable shaft, a collar at the outer end of said shaft, means for connecting said shaft to said rotor for driving said shaft and permitting longitudinal movement of the shaft independently of the rotor, and means for adjusting said shaft longitudinally comprising a housing fitting around said shaft and having its closed end resting against one face of said collar, a ball bearing in said housing and engaging the opposite face of said collar, a cap fitting over the open end of said housing, means on the cap for holding the ball bearing in place, and an adjusting screw cooperating with said cap.

3. In a molding machine, the combination with an electric motor including a rotor, of a cutter head, a shaft carrying said cutter head and extending axially of the motor, said shaft being formed in sections, discs on the meeting ends of the shaft sections, pins carried by one disc and entering openings in the other disc for causing the shaft sections to rotate in unison, means for driving the shaft from the rotor, ball bearings for the shaft, housings for the ball bearings, and means connected to one of the housings for moving said shaft longitudinally.

4. In a molding machine, the combination with an electric motor, of a shaft driven by and having sliding connection with said motor, a yoke carrying said motor, a bearing for said shaft, a housing surrounding said bearing and slidably mounted in said yoke, a collar on said shaft between said bearing and housing, a cap enclosing said bearing within said housing and forcing the same against said collar, and a screw associated with said cap for moving said housing for adjusting said shaft lengthwise.

In testimony whereof I hereunto affix my signature.

ROBERT D. EAGLESFIELD.

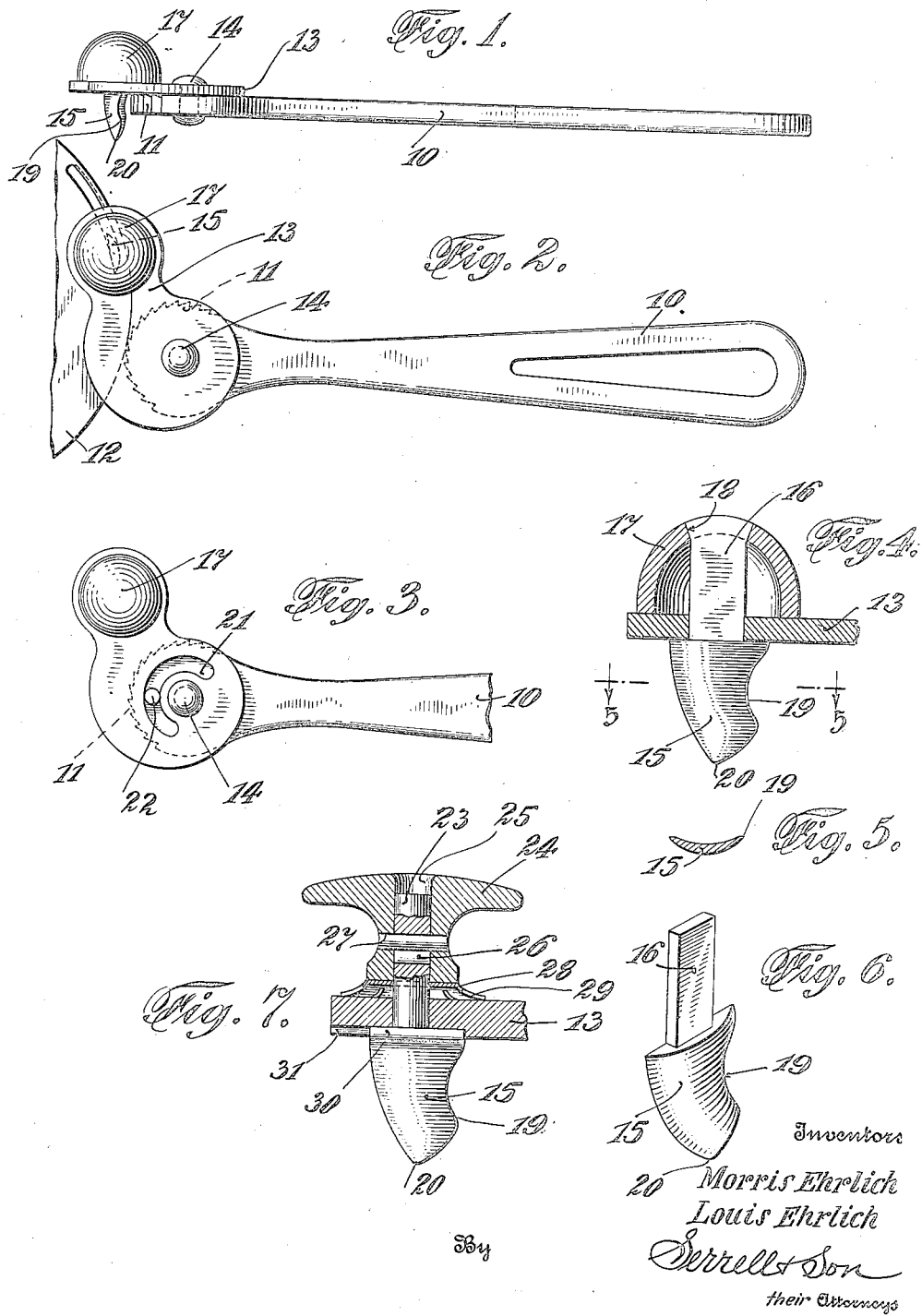

UNITED STATES PATENT OFFICE.

MORRIS EHRLICH AND LOUIS EHRLICH, OF BROOKLYN, NEW YORK.

CAN OPENER.

1,407,521.

Specification of Letters Patent. Patented Feb. 21, 1922.

Application filed June 14, 1921. Serial No. 477,359.

*To all whom it may concern:*

Be it known that we, MORRIS EHRLICH and LOUIS EHRLICH, citizens of the United States, residing at the borough of Brooklyn, in the county of Kings, city and State of New York, have jointly invented an Improvement in Can Openers, of which the following is a specification.

Our present invention relates to a device for opening tin cans or other like containers, of the character shown in our co-pending application, Serial No. 459,315, filed April 7, 1921, in which a rack or toothed segment is secured between forked members at one end of a handle; and the objects of our present invention are to lessen the cost of manufacture by reducing the number of parts; to guide the movement of the knife carrier and cause the knife to cut a slit uniformly parallel with the edge of the can; to limit the movement of the cutter carrier, and furthermore to provide means for absorbing shock and preventing injury to the user in operating the tool.

The details of construction and operation are hereinafter particularly described.

In the accompanying drawing:

Figure 1, is a side elevation of our improved tool.

Fig. 2, is a top plan view of the same, showing the tool engaging a can in the act of cutting its top.

Fig. 3, is a top plan view showing a modification, the handle being partly broken away.

Fig. 4, is vertical section of the cutter carrier and knob, showing the knife and its shank in elevation.

Fig. 5, is a sectional view of the knife taken on the broken line 5—5, of Fig. 4.

Fig. 6, is a perspective view of the knife and its shank, and

Fig. 7, is a vertical section illustrating another modification.

Similar reference characters denote like parts throughout the several views.

10 indicates a flat strip of metal shaped to form a convenient handle and also acting as a lever.

One end of this handle is rounded and provided with teeth 11, adapted to engage the outer edge of a can 12.

A link plate 13, is pivotally connected to the toothed end of the handle 10, by a rivet or pivot pin 14.

This link plate carries a knife or cutter 15 at its other or free end.

The knife or cutter is provided with an integral shank 16, which extends through an opening in the free end of the link plate 13, and into and through a knob 17, upon the top of said link plate.

In the simpler and preferred form, the knife shank is of the shape shown in Fig. 6, and the opening in the link plate 13, through which it passes is of a corresponding shape, the upper end of the shank entering a dovetail slot 18, in the top of the knob 17, which in this case is preferably hollow, the side edges of the upper part of the shank being hammered into such slot and the top surface smoothed to present a uniform flush surface at the top of the knob. This securely connects the knife to its carrier 13, and to the knob and prevents any possibility of its turning or becoming loose.

The knife or cutter 15, is substantially concavo-convex as shown in Fig. 5, and has an inwardly curved cutting edge 19. Its lower end is provided with a point 20, capable of being driven through the metal of a can top by a blow on the knob 17.

In opening a can, the point 20, of the cutter, is positioned adjacent the peripheral edge of the can and the top of the knob 17, is struck a blow by the hand which forces the lower end of the cutter through the top of the can, the link plate 13, resting upon the top edge of the can, which brings the curved center of the cutting edge of the knife in a position to engage the metal of the can top.

The handle 10, is then pushed forward so that the teeth upon its end engage the outer edge of the can forward of the cutting edge of the knife.

Now by moving the handle, in the direction in which the cutting edge of the knife faces, the cutter will be drawn forward steadily making a clean cut in the metal leaving a smooth edge, while at the same time